(12) United States Patent
Ridell

(10) Patent No.: US 11,129,514 B2
(45) Date of Patent: Sep. 28, 2021

(54) TIME OPTIMIZATION IN A DEVICE UTILIZING WATER FOR A CLEANING PROCEDURE

(71) Applicant: ORBITAL SYSTEMS AB, Malmö (SE)

(72) Inventor: Michael Ridell, Staffanstorp (SE)

(73) Assignee: ORBITAL SYSTEM AB, Malmö (SE)

( * ) Notice: Subject to any disclaimer, the term of this patent is extended or adjusted under 35 U.S.C. 154(b) by 164 days.

(21) Appl. No.: 16/494,352

(22) PCT Filed: Mar. 12, 2018

(86) PCT No.: PCT/SE2018/050233
§ 371 (c)(1),
(2) Date: Sep. 16, 2019

(87) PCT Pub. No.: WO2018/169473
PCT Pub. Date: Sep. 20, 2018

(65) Prior Publication Data
US 2020/0129041 A1    Apr. 30, 2020

(30) Foreign Application Priority Data

Mar. 15, 2017  (SE) .................................. 1750305-3

(51) Int. Cl.
*D06F 33/48*  (2020.01)
*A47L 15/44*  (2006.01)
(Continued)

(52) U.S. Cl.
CPC ........... *A47L 15/44* (2013.01); *A47L 15/4297* (2013.01); *D06F 33/46* (2020.02); *D06F 34/22* (2020.02);
(Continued)

(58) Field of Classification Search
CPC ...................................................... A47L 15/22
See application file for complete search history.

(56) References Cited

U.S. PATENT DOCUMENTS

| | | |
|---|---|---|
| 3,114,253 A | 12/1963 | Morey et al. |
| 5,048,139 A | 9/1991 | Matsumi et al. |

(Continued)

FOREIGN PATENT DOCUMENTS

| | | |
|---|---|---|
| CN | 104233700 A | 12/2014 |
| EP | 3128065 A1 | 2/2017 |
| GB | 2266898 A | 11/1993 |

OTHER PUBLICATIONS

International Search Report on application No. PCT/SE2018/050233 dated May 22, 2018.

*Primary Examiner* — Jason Y Ko
(74) *Attorney, Agent, or Firm* — Moser Taboada

(57) ABSTRACT

The present inventive concept relates to a device (500) utilizing water for a group of cleaning procedures, wherein each cleaning procedure (100) in the group of cleaning procedures comprises a plurality of cleaning phases (102, 104, 106, 108) each using cleaning phase water having a substance content with respect to a number of substances, wherein the device (500) comprises a sensor arrangement (554) configured to determine a first substance content (110) with respect to at least one of the number of substances in first cleaning phase water from a first cleaning phase (102) being part of the plurality of cleaning phases (102, 104, 106, 108); wherein the device (500) is configured to end the first cleaning phase (102) if a pre-determined condition related to the first substance content (110) and associated with the first cleaning phase (102) has been met.

8 Claims, 4 Drawing Sheets

(51) Int. Cl.
*D06F 34/22* (2020.01)
*A47L 15/42* (2006.01)
*D06F 33/46* (2020.01)
*D06F 103/20* (2020.01)
*D06F 105/00* (2020.01)
*D06F 105/52* (2020.01)
*D06F 39/00* (2020.01)

(52) U.S. Cl.
CPC ....... *A47L 2401/10* (2013.01); *A47L 2501/02* (2013.01); *D06F 39/006* (2013.01); *D06F 2103/20* (2020.02); *D06F 2105/00* (2020.02); *D06F 2105/52* (2020.02)

(56) References Cited

U.S. PATENT DOCUMENTS

| | | |
|---|---|---|
| 5,331,177 A | 7/1994 | Kubisiak et al. |
| 5,373,714 A | 12/1994 | Wada |
| 5,603,233 A | 2/1997 | Erickson et al. |
| 2003/0140947 A1 | 7/2003 | Han et al. |
| 2014/0366916 A1 | 12/2014 | Lundberg et al. |
| 2016/0168776 A1 | 6/2016 | Xu et al. |

TIME OPTIMIZATION IN A DEVICE UTILIZING WATER FOR A CLEANING PROCEDURE

TECHNICAL FIELD

The inventive concept described herein generally relates to the field of cleaning procedures utilizing water. More particularly, concepts for time optimization in devices utilizing water for a cleaning procedure are disclosed.

BACKGROUND

In many parts of the world, water is becoming a scarce commodity. Consequently, systems for purification and recycling of water has found applications across many fields. For example, the treatment and recycling of graywater from cleaning procedures (e.g., waste water generated by carwashes, dishwashers, showers, and laundry machines) has been explored and put into practice during the past decades. Conventional devices utilizing water for cleaning procedures and recycling such graywater can be effective, but are often based on a primitive setup. For example, such devices often operate based on a set of pre-determined cleaning programs based on the most common user needs. There is therefore a need to improve devices utilizing water for cleaning procedures in terms of cost effectiveness, ease of use, customizability, and adaptation to multiple applications.

SUMMARY OF THE INVENTION

It is an object of the present inventive concept to mitigate, alleviate or eliminate one or more of the above-identified deficiencies in the art and disadvantages singly or in combination.

According to a first aspect of the inventive concept, these and other objects are achieved in full, or at least in part, by a device utilizing water for a group of cleaning procedures, wherein each cleaning procedure in the group of cleaning procedures comprises a plurality of cleaning phases each using cleaning phase water having a substance content with respect to a number of substances, wherein the device comprises a sensor arrangement configured to determine a first substance content with respect to at least one of the number of substances in first cleaning phase water from a first cleaning phase being part of the plurality of cleaning phases; wherein the device is configured to end the first cleaning phase if a pre-determined condition related to the first substance content and associated with the first cleaning phase has been met.

The pre-determined condition may comprise the substance content being within a first substance content interval.

The sensor arrangement may be further configured to determine a second substance content with respect to the at least one of the number of substances in the first cleaning phase water, and wherein the sensor arrangement is configured to determine the first and second substance content at different points in time and to compare the first and second substance content to each other in order to determine a substance content rate of change with respect to the at least one of the number of substances, wherein the pre-determined condition comprises the substance content rate of change being within a substance content rate of change interval, and wherein the pre-determined condition is further related to the second substance content.

The device may be a washing machine.

The device may further comprise a water treatment arrangement configured to decrease a level of the at least one of the number of substances in cleaning phase water from the plurality of cleaning phases.

The sensor arrangement may comprise at least one of an electrical conductivity sensor, a pH sensor, and a turbidity sensor.

According to a second aspect of the inventive concept, these and other objects are achieved in full, or at least in part, by a method for optimizing a duration of a cleaning procedure in a device utilizing water for a group of cleaning procedures, wherein each cleaning procedure comprises a plurality of cleaning phases each using cleaning phase water having a substance content with respect to a number of substances, wherein the device comprises a sensor arrangement, wherein the method comprises the steps of: determining a first substance content with respect to at least one of the number of substances in first cleaning phase water from a first cleaning phase being part of the plurality of cleaning phases; and ending the first cleaning phase if a pre-determined condition related to the first substance content and associated with the first cleaning phase have been met.

The pre-determined condition may comprise the first substance content being within a first substance content interval.

The method may further comprise the steps of: determining a second substance content with respect to the at least one of the number of substances in the first cleaning phase water, wherein the determination of the first and second substance content is performed at different points in time; comparing the first and second substance content to each other in order to determine a substance content rate of change with respect to the at least one of the number of substances; wherein the pre-determined condition comprises the substance content rate of change being within a substance content rate of change interval.

The device may be a washing machine.

The device may further comprise a water treatment arrangement, wherein the method further comprises the steps of: treating cleaning phase water from at least one of the plurality of cleaning phases in the water treatment arrangement in order to decrease a level of the at least one of the number of substances in the cleaning phase water from the at least one of the plurality of cleaning phases.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

DETAILED DESCRIPTION

Figure 1:
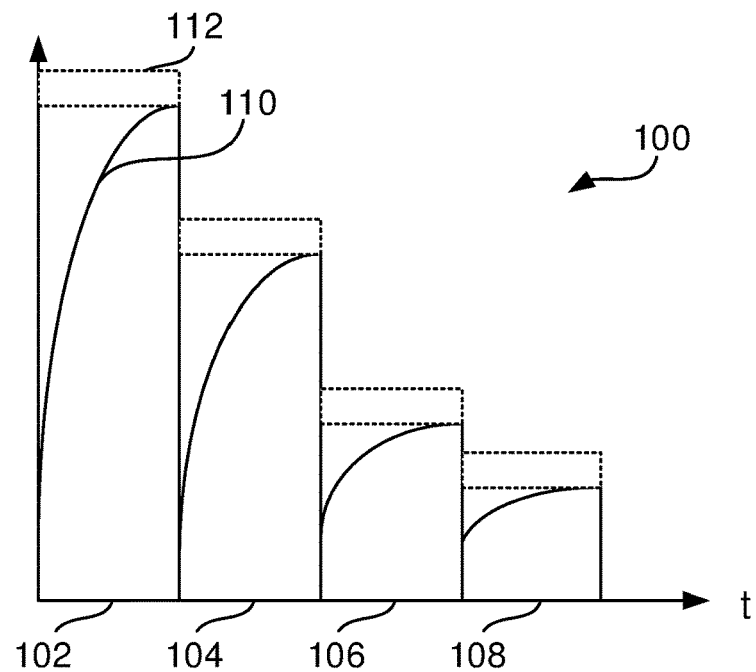
FIG. 1 schematically illustrates an example of substance content over time in cleaning phase water in a plurality of cleaning phases in a cleaning procedure.

The present disclosure describes a device utilizing water for a group of cleaning procedures and related methods. Initially, some terminology may be defined to provide clarification for the following disclosure.

Throughout the present disclosure, references are made to a group of cleaning procedures. Such a group of cleaning procedures may be a number of washing programs in a washing machine. Each cleaning procedure in the group of cleaning procedure may comprise a plurality of cleaning phases. Examples of such cleaning phases include a pre-wash, a main wash, a rinsing, and the like, of a washing machine.

Throughout the present disclosure, references are made to substances. The term "substance" should be interpreted to comprise a chemical element, i.e. a species of atoms, a molecule, a compound, or any combination of the same. For example, a substance may refer to a detergent, a softener, a dirt particle, fibrous matter, lipids, carbohydrates, and/or proteins. As is readily appreciated by the person skilled in the art, several other substances may be comprised within the term "substance" in the context of the present application. The substance content may be defined in a unit per volume.

With reference to substances and cleaning phases, it may be noted that different phases of a cleaning procedure are likely to comprise different substances. In particular, it may be preferably to monitor a specific substance(s) during specific a specific cleaning phase(s). For example, during a pre-wash it may be preferable to monitor the substance level of e.g. lipids, dirt, fibrous matter, or similar matter being released from e.g. a clothing. In a main wash, it may be preferable to monitor the substance level of e.g. a detergent or an active cleaning component with respect to the substance content requirement interval of the specific substance. It is to be understood that the above examples are not limiting, and that it may be preferable to monitor other substances during the cleaning phases of a cleaning procedure. In this regard, it may also be noted that the water treatment arrangement may be configured to remove a plurality of substances from cleaning phase water.

Throughout the present disclosure, for the sake of clarity, references are made to a "first cleaning phase". It is to be understood that the cleaning phase referred to as the "first cleaning phase" is not necessarily a cleaning phase initiating the cleaning procedure.

The present disclosure is mainly described in the context of a washing machine. However, as is readily appreciated by the person skilled in the art, the inventive concept may be applied to other devices utilizing water for a group of cleaning procedures, such as a shower, a dishwasher, or a car wash.

According to the prior art, devices utilizing water for a cleaning procedure comprising a plurality of cleaning phases are commonly configured to run each of the plurality of cleaning phases for a pre-determined period of time. For example, a washing program in a washing machine may consist of a 30-minute pre-wash, a 60-minute main wash, and a 30-minute rinse. Some washing machines take into account the combined weight of the items being washed in order to adjust the pre-determined time period. However, none of these washing programs continuously monitor the progress of the washing program in terms of when the items being cleaned are clean.

In contrast, the present inventive concept is based on the realization that a cleaning procedure comprising a plurality of cleaning phases may be optimized by determining a substance content of cleaning phase water used in the plurality of cleaning phases, and subsequently end any of the plurality of cleaning phases when a pre-determined condition related to the substance content has been met. For example, any of the plurality of cleaning phases may be ended when the substance content is within a substance content interval, and/or when a rate of change of the substance content is within a substance content rate of change interval.

According to the inventive concept, a device utilizing water for a group of cleaning procedures, wherein each cleaning procedure in the group of cleaning procedures comprises a plurality of cleaning phases each using cleaning phase water having a substance content with respect to a number of substances, may comprise: a sensor arrangement configured to determine a first substance content with respect to at least one of the number of substances in first cleaning phase water from a first cleaning phase being part of the plurality of cleaning phases; wherein the device is configured to end the first cleaning phase if a pre-determined condition related to the first substance content and associated with the first cleaning phase has been met.

With reference to FIG. 1, a schematic representation of substance content over time in cleaning phase water in a plurality of cleaning phases in a cleaning procedure 100 is illustrated. The vertical axis represents a level of at least one substance. The cleaning procedure 100 may comprise a plurality of cleaning phases 102, 104, 106, 108. Between each of the plurality of cleaning phases 102, 104, 106, 108, cleaning phase water from the respective cleaning phase may be discharged from the device, and external water may be input to the device via an external water path. A sensor arrangement may determine a first substance content 110 with respect to at least one of the number of substances in first cleaning phase water from a first cleaning phase 102. In the illustrated example, the first substance content 110 is represented by a continuous line. However, the sensor arrangement may be configured to determine a substance content at pre-determined intervals, resulting in discrete data points representing the first substance content 110. If the first substance content 110 meets a pre-determined condition related to the first substance content 110 and associated with the first cleaning phase 102, the first cleaning phase 102 may be ended. In the illustrated example, the predetermined condition comprises the first substance content 110 being within a first substance content interval 112. Similarly, the remaining cleaning phases 104, 106, 108 in the illustrated example may be ended when a substance content associated with the respective cleaning phases 104, 106, 108 are within a substance content interval associated with the respective cleaning phases 104, 106, 108. It is to be understood that the substance referred to in the substance content of each of the plurality of cleaning phases 102, 104, 106, 108 does not necessarily have to be one and the same substance. For example, in the first cleaning phase 102 a first substance content may be determined with respect to a first substance, and in a second cleaning phase 104 a second substance content may be determined with respect to a second substance, wherein the first and second substance are different substances.

Figure 2:
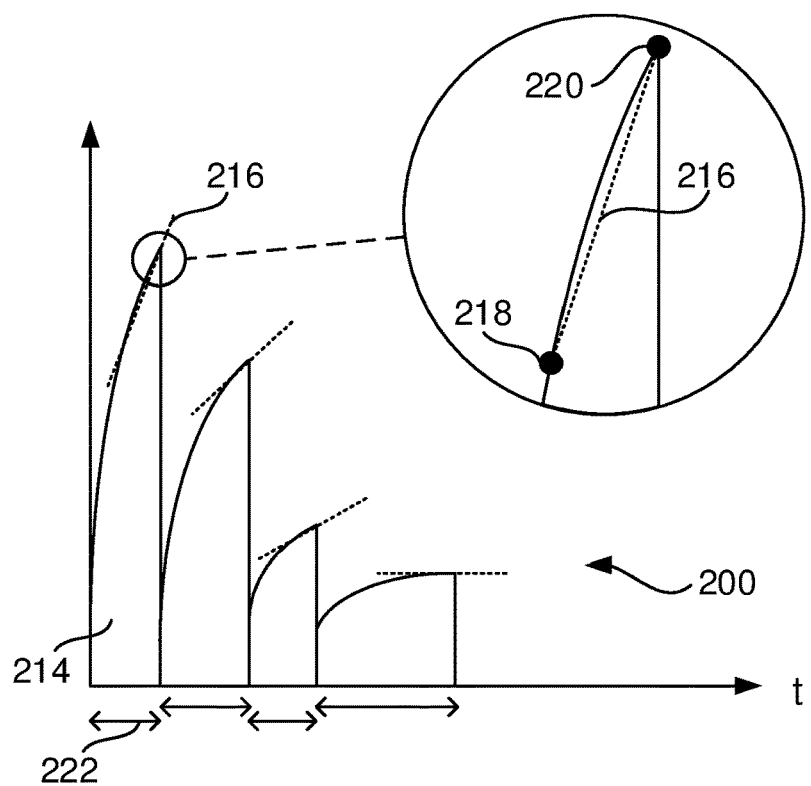
FIG. 2 schematically illustrates an example of substance content over time in cleaning phase water in a plurality of cleaning phases in a cleaning procedure.

Referring now to FIG. 2, a schematic representation of substance content over time in cleaning phase water in a plurality of cleaning phases in a cleaning procedure 200 is illustrated. The vertical axis represents a level of at least one substance. A sensor arrangement may determine a first substance content 218 in cleaning phase water from a first cleaning phase 214 with respect to at least one of the number of substances. The sensor arrangement may determine a second substance content 220 with respect to the at least one of the number of substances. The determination of the first substance content 218 may be performed at a different point in time with respect to the determination of the second substance content 220. In other words, a time period may elapse between the determination of the first substance content 218 and the determination of the second substance content 220. A difference between the first substance content 218 and the second substance content 220 may then be determined, and a substance content rate of change 216 with respect to the at least one of the number of substances may be determined. The determination of the substance content rate of change 216 may be based on the elapsed time period. The pre-determined condition related to the first substance content 218 and the second substance content 220 and associated with the first cleaning phase 214 may comprise the substance content rate 216 being within a substance content rate of change interval (not shown). Thus, the first cleaning phase 214 may be ended when the pre-determined condition has been met. A first time period 222 representing a duration of the first cleaning phase 214 may thus be defined by the pre-determined condition.

Figure 3:
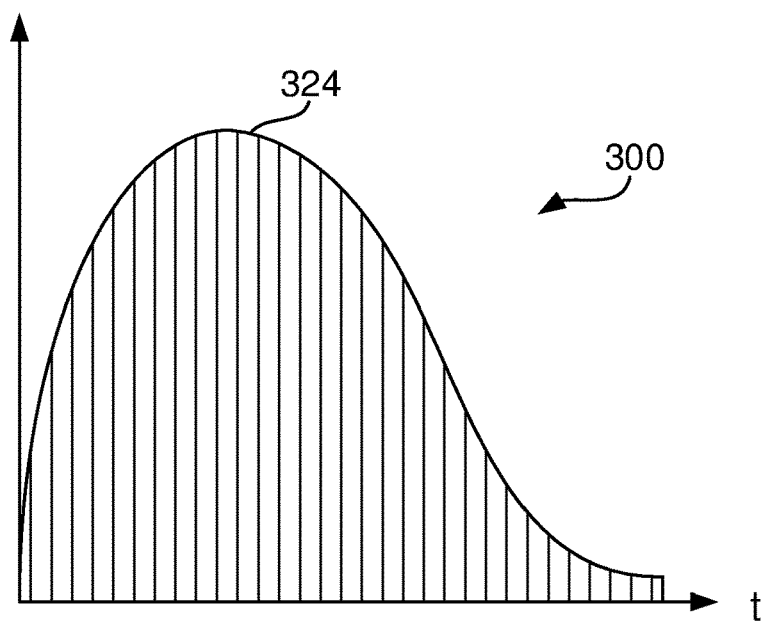
FIG. 3 schematically illustrates an example of substance content over time in cleaning phase water in a plurality of cleaning phases in a cleaning procedure.

Referring now to FIG. 3, a cleaning procedure 300 may comprise a plurality of cleaning phases 324. Each of the plurality of cleaning phases 324 may comprise cleaning phase water having a substance content with respect to a number of substances. Similarly to what is disclosed above, each of the plurality of cleaning phases 324 may be ended when a pre-determined condition has been met. In the illustrated example, cleaning phase water from the plurality of cleaning phases 324 is not necessarily discarded between each of the plurality of cleaning phases 324. Instead, cleaning phase water from any of the plurality of cleaning phases 324 may be treated in a water treatment arrangement of the device. Hereby, a level of at least one of the number of substances in cleaning phase water from the plurality of cleaning phases 324 may be decreased. Accordingly, a pre-determined condition related to a substance content related to at least one of the number of substances and associated with at least one of the plurality of cleaning phases 324 may be met, and the at least one of the plurality of cleaning phases 324 may be ended. In other words, cleaning phase water used in the cleaning procedure 300 may be continuously treated in the water treatment arrangement such that a substance content of cleaning phase water in the cleaning procedure 300 is altered. Consequently, a cleaning procedure may be completed without the need of discharging water from the washing chamber in order to remove substances from the washing procedure.

Figure 5:
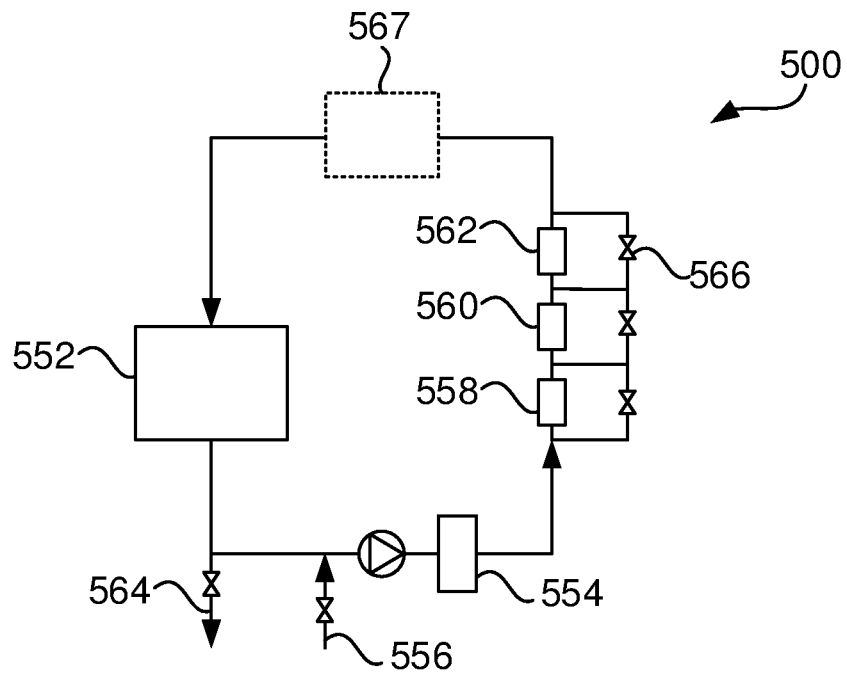
FIG. 5 schematically illustrates a device utilizing water for a group of cleaning procedures.

The arrangement as described in conjunction with FIG. 3 may advantageously comprise a water treatment arrangement as described in conjunction with FIG. 5, such that several different substances may be removed from the cleaning phase water by the plurality of water treatment devices.

Figure 4:
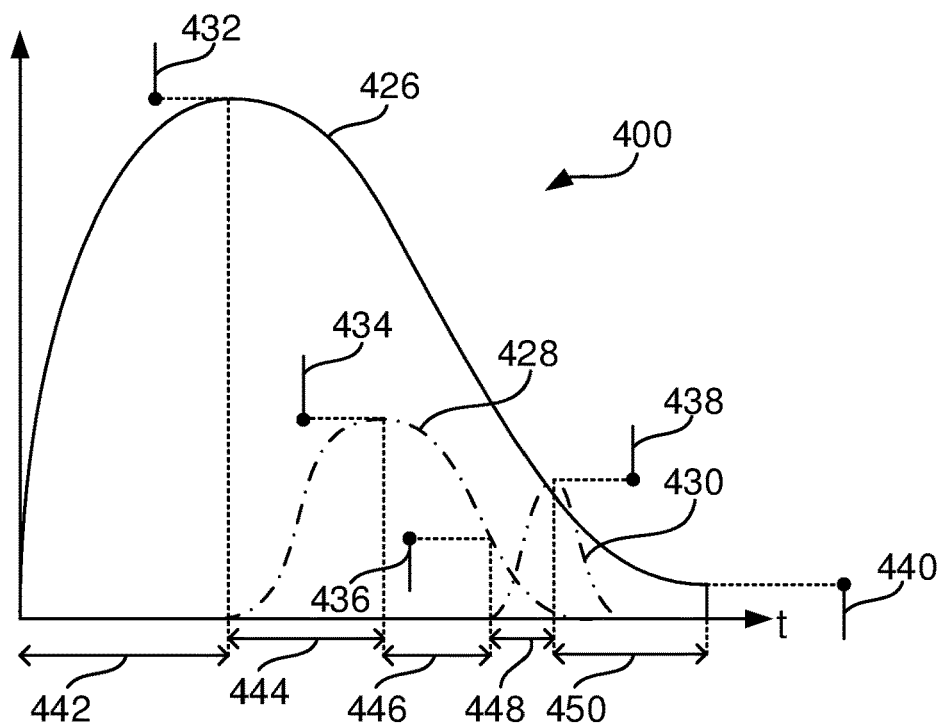
FIG. 4 schematically illustrates an example of substance content over time in cleaning phase water in a plurality of cleaning phases in a cleaning procedure.

Referring now to FIG. 4, a schematic representation of substance content in cleaning phase water in a plurality of cleaning phases in a cleaning procedure 400 over time is illustrated. In the illustrated example, substance contents with respect to a first substance 426, a second substance 428, and a third substance 430 are illustrated. The vertical axis represents a level of at least the first substance 426, the second substance 428, and the third substance 430. As is readily appreciated by the person skilled in the art, the inventive concept may be applied to a different number of substances and/or a different number of cleaning phases. Further, the illustrated example refers to substance content intervals. However, it is equally possible to determine substance content rate of change intervals for the cleaning procedure 400. Further, substance content intervals 432, 434, and 438 may have an infinite right-hand endpoint. The substance content intervals 436 and 440 may have an infinite left-hand endpoint.

A first substance content with respect to the first substance 426 may be determined, and if the first substance content is within a first substance content interval 432, the first cleaning phase 442 may be ended.

A second cleaning phase 444 may then be initiated. Cleaning phase water from the second cleaning phase 444 may be treated in the water treatment arrangement, such that a level of the first substance 426 decreases. It may also be possible to introduce the second substance 428 to the water of the second cleaning phase 444. The second substance 428 may for example be a detergent The second substance 428 may cause the level of the first substance 426 to decrease. A second substance content with respect to the second substance 428 may be determined, and if the second substance content is within a second substance content interval 434, the second cleaning phase 444 may be ended.

A third cleaning phase 446 may then be initiated. Cleaning phase water from the third cleaning phase 446 may be treated in the water treatment arrangement, such that a level of the first substance 426 and/or a level of the second substance 428 is decreased. A third substance content with respect to the second substance 428 may be determined, and if the third substance content is within a third substance content interval 436, the third cleaning phase 446 may be ended.

A fourth cleaning phase 448 may then be initiated. Cleaning phase water from the fourth cleaning phase 448 may be treated in the water treatment arrangement, such that a level of the first substance 426 and/or the second substance 428 is decreased. The third substance 430 may be introduced to the water of the fourth cleaning phase 448. A fourth substance content with respect to the third substance 430 may be determined, and if the fourth substance content is within a fourth substance content interval 438, the fourth cleaning phase may be ended.

A fifth cleaning phase 450 may then be initiated. Cleaning phase water from the fifth cleaning phase 450 may be treated in the water treatment arrangement, such that a level of the first substance 426 and/or a level of the third substance 430 is decreased. A fifth substance content with respect to the first substance 426 may be determined, and if the fifth substance content is within a fifth substance content interval 440, the fifth cleaning phase may be ended. The cleaning procedure 400 may thus be completed.

With reference to FIG. 5, a device 500 utilizing water for a group of cleaning procedures according to the inventive concept will now be described. The cleaning procedure may take place in a cleaning chamber 552. Such a cleaning chamber may be a drum of a washing machine.

The device 500 may comprise a sensor arrangement 554 configured to determine a first substance content of first cleaning phase water from a first cleaning phase of the cleaning procedure. The sensor arrangement 554 may comprise a plurality of sensors. The sensor arrangement 554 may comprise an electrical conductivity sensor. The sensor arrangement 554 may comprise a turbidity sensor. The sensor arrangement 554 may comprise a pH sensor.

The device 500 may comprise an external water path 556 in liquid communication with an external water source.

The device 500 may comprise a water treatment arrangement. The water treatment arrangement may comprise a plurality of water treatment devices 558, 560, 562. Each of the plurality of water treatment devices may be configured to remove a different substance from cleaning phase water of the cleaning procedure. In other words, each of the plurality of water treatment devices may be configured to remove a respective substance from cleaning phase water, wherein each respective substance is different. For example, the water treatment arrangement may comprise a water treatment device configured to remove a detergent. The water treatment arrangement may comprise a chemical absorbent, a filter, a heat treatment, a UV treatment, or any combination of the same.

The device 500 may comprise a discharge path 564 configured to drain cleaning phase water from the device 500.

The device 500 may comprise a valve arrangement comprising a number of valves 566 configured to restrict and allow a flow of water in the device 500. In particular, the number of valves 566 may be configured to direct water to the water treatment arrangement.

The device may comprise a water tank 567 configured to store the cleaning phase water to be used in the at least one of the plurality of cleaning phases. The water tank 567 may comprise a plurality of compartments for storing a plurality of volumes of cleaning phase. At least part of the sensor arrangement 554 may be located in the water tank 567, such that a substance content of water in the water tank 567 can be determined. It is to be understood that the water tank 540 need not necessarily be arranged in the device as such. In contrast, the water tank 540 may be arranged in a location separate from the device, thus forming a system comprising the device and the water tank 540.

Figure 6:
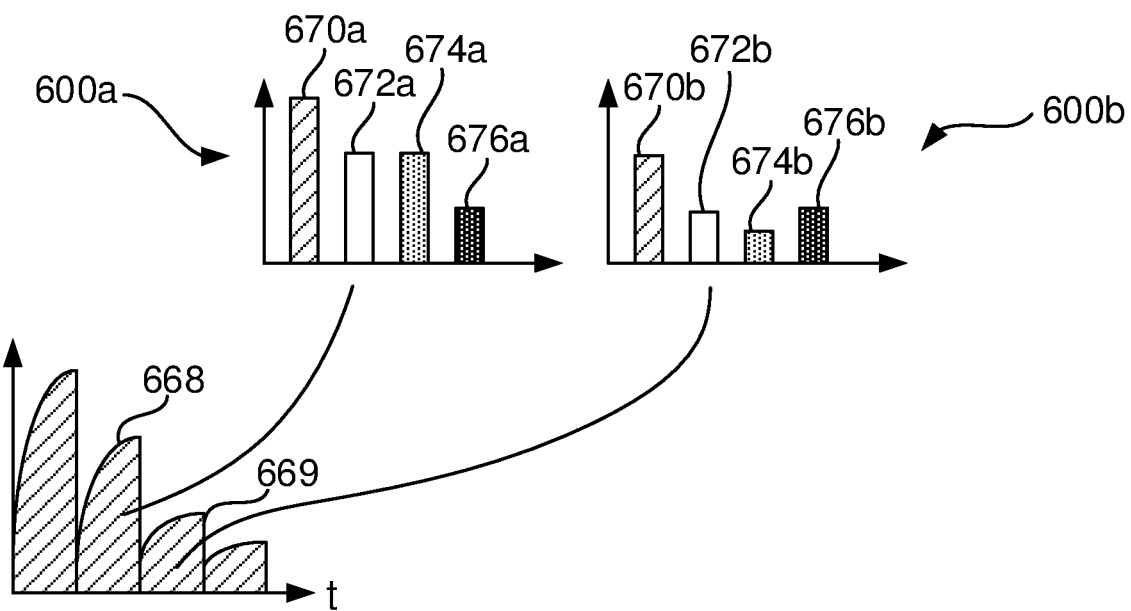
FIG. 6 schematically illustrates substance content in a plurality of cleaning phases of a cleaning procedure.

Referring now to FIG. 6, an example of a cleaning procedure comprising a plurality of cleaning phases is illustrated. The first cleaning phase 668 may utilize cleaning phase water having a substance content 600*a* with respect to a number of substances 670*a*, 672*a*, 674*a*, 676*a*. A second cleaning phase 669 may utilize water having a substance content 600*b* with respect to a number of substance levels 670*b*, 672*b*, 674*b*, 676*b*. Here, the substance level 670*a* indicates a level of a first substance in water from the first cleaning phase 668, and the substance level 670*b* indicates a level of the same substance in water from the second cleaning phase 669. Similarly, the substance levels 672*a*, 674*a*, and 676*a* indicates a level of a specific substance respectively, and the substance levels 672*b*, 674*b*, and 676*b* indicates a level of the same specific substance respectively. For the sake of clarity, only the substance corresponding to substance levels 670*a* and 670*b* is shown in the graph illustrating the cleaning procedure. A number of substances may influence the cleaning procedure, and in particular, may influence at least one of the cleaning phases, with respect to a variety of parameters, such as energy consumption, water consumption, cleaning effectivity, and environmental impact. Similarly, some substances may not impact the cleaning procedure at all. Thus, for one of the plurality of cleaning phases, a first substance may be of interest with respect to the pre-determined condition, and for another of the plurality of cleaning phases, another substance may be of interest with respect to the pre-determined condition.

Figure 7:
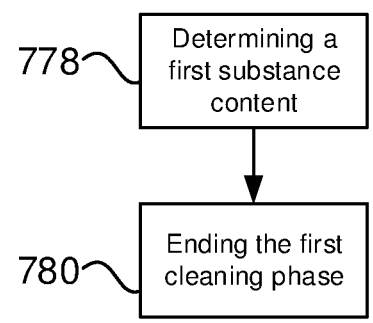
FIG. 7 is a flow chart diagram of a method for optimizing a duration of a cleaning procedure in a device utilizing water for a group of cleaning procedures.

Referring now to FIG. 7, a method for optimizing a duration of a cleaning procedure in a device utilizing water for a group of cleaning procedures, wherein each cleaning procedure comprises a plurality of cleaning phases each using cleaning phase water having a substance content with respect to a number of substances, wherein the device comprises a sensor arrangement, may comprise the steps of determining a first substance content 778 with respect to at least one of the number of substances in first cleaning phase water from a first cleaning phase being part of the plurality of cleaning phases; and ending the first cleaning phase 780 if a pre-determined condition related to the first substance content and associated with the first cleaning phase have been met.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF REFERENCE SIGNS

100 Cleaning procedure
102 First cleaning phase
104 Cleaning phase
106 Cleaning phase
108 Cleaning phase
110 First substance content
112 First substance content interval
200 Cleaning procedure
214 First cleaning phase
216 Substance content rate of change
218 First substance content
220 Second substance content
222 First time period
300 Cleaning procedure
324 Plurality of cleaning phases
400 Cleaning procedure
426 First substance
428 Second substance
430 Third substance
432 First substance content interval
434 Second substance content interval
436 Third substance content interval
438 Fourth substance content interval
440 Fifth substance content interval
442 First cleaning phase 444 Second cleaning phase
446 Third cleaning phase
448 Fourth cleaning phase
450 Fifth cleaning phase
500 Device
552 Washing chamber
554 Sensor arrangement
556 External water path
558 Water treatment device
560 "
562 "
564 Discharge path
566 Valve
567 Water tank
600a Substance content
600b Substance content
668 First cleaning phase
669 Second cleaning phase
670a Substance level of first substance
670b "
672a Substance level of other substance
672b "
674a "
674b "
676a "
676b "
778 Step of determining a first substance content
780 Step of ending the first cleaning phase

The invention claimed is:

1. A device utilizing water for a group of cleaning procedures, wherein each cleaning procedure in the group of cleaning procedures comprises a plurality of cleaning phases each using cleaning phase water having a substance content with respect to a number of substances, wherein the device comprises:
   a sensor arrangement configured to determine a first substance content with respect to at least one of the number of substances in first cleaning phase water from a first cleaning phase being part of the plurality of cleaning phases,
   wherein the sensor arrangement is further configured to determine a second substance content with respect to the at least one of the number of substances in the first cleaning phase water,
   wherein the sensor arrangement is configured to determine the first and second substance content at different points in time and to compare the first and second substance content to each other in order to determine a substance content rate of change with respect to the at least one of the number of substances,
   wherein the device is configured to end the first cleaning phase if a pre-determined condition related to the first and second substance content and associated with the first cleaning phase has been met, and
   wherein the pre-determined condition comprises the substance content rate of change being within a substance content rate of change interval.

2. The device according to claim 1, wherein the pre-determined condition comprises the substance content being within a first substance content interval.

3. The device according to claim 1, wherein the device is a washing machine.

4. The device according to claim 1, further comprising a water treatment arrangement configured to decrease a level of the at least one of the number of substances in cleaning phase water from the plurality of cleaning.

5. The device according to claim 1, wherein the sensor arrangement comprises at least one of an electrical conductivity sensor, a pH sensor, and a turbidity sensor.

6. A method for optimizing a duration of a cleaning procedure in a device utilizing water for a group of cleaning procedures, wherein each cleaning procedure comprises a plurality of cleaning phases each using cleaning phase water having a substance content with respect to a number of substances, wherein the device comprises a sensor arrangement, wherein the method comprises:
   determining a first substance content with respect to at least one of the number of substances in first cleaning phase water from a first cleaning phase being part of the plurality of cleaning phases;
   determining a second substance content with respect to the at least one of the number of substances in the first cleaning phase water, wherein the determination of the first and second substance content is performed at different points in time;
   comparing the first and second substance content to each other in order to determine a substance content rate of change with respect to the at least one of the number of substances; and
   ending the first cleaning phase if a pre-determined condition related to the first substance content and associated with the first cleaning phase have been met,
   wherein the pre-determined condition comprises the substance content rate of change being within a substance content rate of change interval.

7. The method according to claim 6, wherein the pre-determined condition comprises the first substance content being within a first substance content interval.

8. The method according to claim 6, wherein the device further comprises a water treatment arrangement, wherein the method further comprises:
   treating cleaning phase water from at least one of the plurality of cleaning phases in the water treatment arrangement in order to decrease a level of the at least one of the number of substances in the cleaning phase water from the at least one of the plurality of cleaning phases.

* * * * *